United States Patent
Jarvis et al.

(10) Patent No.: US 12,190,165 B2
(45) Date of Patent: *Jan. 7, 2025

(54) COMPUTING ENVIRONMENT POOLING

(71) Applicant: PIVOTAL SOFTWARE, INC., Palo Alto, CA (US)

(72) Inventors: Michael Jarvis, San Francisco, CA (US); Mark Stokan, San Francisco, CA (US); Kenneth Lakin, San Francisco, CA (US); Der Wei Chan, Marham (CA); Navdeep Pama, Brampton (CA)

(73) Assignee: PIVOTAL SOFTWARE, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/317,916

(22) Filed: May 15, 2023

(65) Prior Publication Data
US 2023/0289234 A1  Sep. 14, 2023

Related U.S. Application Data

(63) Continuation of application No. 15/886,687, filed on Feb. 1, 2018, now Pat. No. 11,762,706.

(51) Int. Cl.
*G06F 9/50* (2006.01)
*G06F 9/455* (2018.01)

(52) U.S. Cl.
CPC .......... *G06F 9/505* (2013.01); *G06F 9/45558* (2013.01); *G06F 9/5077* (2013.01); *G06F 2009/4557* (2013.01); *G06F 2009/45575* (2013.01); *G06F 2009/45591* (2013.01)

(58) Field of Classification Search
CPC .... G06F 9/505; G06F 9/45558; G06F 9/5077; G06F 2009/4557; G06F 2009/45575; G06F 2009/45591; G06F 2009/45562; G06F 2209/5014
See application file for complete search history.

(56) References Cited

U.S. PATENT DOCUMENTS

| | | | |
|---|---|---|---|
| 8,037,187 B2 | 10/2011 | Dawson et al. | |
| 8,352,611 B2 | 1/2013 | Maddhuri et al. | |
| 8,402,139 B2 | 3/2013 | Ferris et al. | |
| 9,251,115 B2 | 2/2016 | Bursell | |
| 9,485,117 B2 | 11/2016 | Ferris | |
| 9,705,820 B2 | 7/2017 | Madduri et al. | |
| 9,860,193 B2 | 1/2018 | Madduri et al. | |

(Continued)

*Primary Examiner* — Bruce S Ashley
(74) *Attorney, Agent, or Firm* — King Intellectual Asset Management

(57) ABSTRACT

Methods, systems, and computer-readable media that manage cloud computing environments. A pool manager creates a pool of cloud computing environments according to a pool specification specifying a headroom threshold of the pool. The pool manager receives, from a requester computer, a request to claim a cloud computing environment. The pool manager determines that one or more cloud computing environments are available. In response, the pool manager provides to the requesting computer credentials for accessing the cloud computing environment. The pool manager designates the cloud computing environment as claimed and unavailable to other requester computers until receiving a notification indicating that the cloud computing environment is unclaimed. The pool manager ensures that the correct number of environments are available on a predetermined schedule.

20 Claims, 4 Drawing Sheets

(56) References Cited

U.S. PATENT DOCUMENTS

| | | |
|---|---|---|
| 2004/0267897 A1 | 12/2004 | Hill et al. |
| 2006/0174252 A1 | 8/2006 | Besbris et al. |
| 2010/0083243 A1 | 4/2010 | Mincarelli et al. |
| 2011/0016214 A1 | 1/2011 | Jackson |
| 2012/0179824 A1 | 7/2012 | Jackson |
| 2014/0019966 A1 | 1/2014 | Neuse et al. |
| 2015/0058467 A1 | 2/2015 | Douglas et al. |
| 2015/0067682 A1 | 3/2015 | Calder et al. |
| 2015/0309828 A1 | 10/2015 | Shaik et al. |
| 2017/0094020 A1 | 3/2017 | Mn et al. |
| 2018/0032543 A1 | 2/2018 | Fecioru et al. |
| 2018/0048536 A1 | 2/2018 | Ghodsi et al. |
| 2018/0060133 A1 | 3/2018 | Fang et al. |

COMPUTING ENVIRONMENT POOLING

CROSS REFERENCE TO RELATED APPLICATIONS

This application is a continuation of U.S. patent application Ser. No. 15/886,687, filed Feb. 1, 2018, entitled "Computing Environment Pooling", the entirety of which is incorporated by reference.

BACKGROUND

This specification generally relates to cloud computing techniques.

Developing an application program for a cloud computing system may require deploying and testing the application program in a cloud computing environment. A developer or developer team can create the cloud computing environment for deploying and testing the application program. Creating the cloud computing environment can include requesting resources from a cloud computing service provider and spinning up the cloud computing environment from the requested resources. Spinning up the cloud computing environment can include creating the cloud computing environment and configuring the cloud computing environment. Creating and configuring the cloud computing environment can include, among other tasks, fetching desired versions of libraries, starting one or more virtual machines (VMs), allocating disk space and memory, and so on. In many cases, spinning up a cloud computing environment can be a time consuming process, taking hours to complete. In addition, the process can introduce human errors. Different developers and different teams may require the same setup of a cloud computing environment. Spinning up cloud computing environments that have the same settings for different developers and different teams may require duplicated work.

SUMMARY

This specification describes methods, systems, and computer-readable media that manage cloud computing environments. A pool manager creates a pool of cloud computing environments according to a pool specification specifying a headroom threshold of the pool. The pool manager receives, from a user device, a request to claim a cloud computing environment for a user. In response, the pool manager provides, to the user, credentials for accessing the cloud computing environment if there are one or more environments available. The pool manager designates the cloud computing environment as claimed and unavailable to other requester computers until receiving a notification indicating that the cloud computing environment is unclaimed by the user or system operator.

Particular embodiments of the subject matter described in this specification can be implemented to realize one or more of the following advantages. Compared to conventional techniques of managing cloud computing environments, the disclosed techniques can reduce duplicated work. A software development project may involve multiple teams from various offices. Conventionally, each team or office creates and maintains a way to select a respective deployment mechanism and spin up cloud computing environment. Accordingly, the work of spinning up cloud computing environments involves duplicated effort from different teams and offices. The disclosed techniques provide a centralized mechanism for sharing cloud computing environments between teams and offices. Individual teams and offices no longer need to manage their own environments. The duplicated work is thus reduced or avoided.

Compared to conventional techniques of managing cloud computing environments, the disclosed techniques can improve security. Different teams, when setting up their own cloud computing environments, may implement various security policies. Some security settings may not be implemented uniformly across the entire development effort, causing security concerns. The disclosed techniques can implement uniform security policies, thus removing security holes.

Compared to conventional techniques of managing cloud computing environments, the disclosed techniques can improve efficiency by reducing or removing waste headroom. Conventionally, each individual team may reserve a certain amount of headroom including spare and redundant resources to accommodate sometimes rare spikes in usage. The disclosed techniques can share the redundancy across teams, thus saving the resources without compromising performance.

Compared to conventional techniques of managing cloud computing environments, the disclosed techniques can improve efficiency by reducing the time for obtaining cloud computing environments. Conventionally, spinning up a cloud computing environment can take a long time, e.g., hours, for creating various virtual machines, allocating resources, and configuring the virtual machines and resources. The disclosed techniques can provide ready-made environments, to allow teams to focus on development rather than focus on preparation for development. Accordingly, a user may need only seconds to obtain a ready-made cloud computing environment, rather than hours for spinning up a new one.

Compared to conventional techniques of managing cloud computing environments, the disclosed techniques can reduce maintenance cost. Conventionally, each team needs to maintain its own cloud computing environments. The disclosed techniques can implement a centralized pool manager that performs maintenance operations for all teams.

The details of one or more embodiments of the subject matter described in this specification are set forth in the accompanying drawings and the description below. Other features, aspects and advantages of the subject matter will become apparent from the description, the drawings and the claims.

BRIEF DESCRIPTIONS OF DRAWINGS

Like reference numbers and designations in the various drawings indicate like elements.

DETAILED DESCRIPTION

Figure 1:
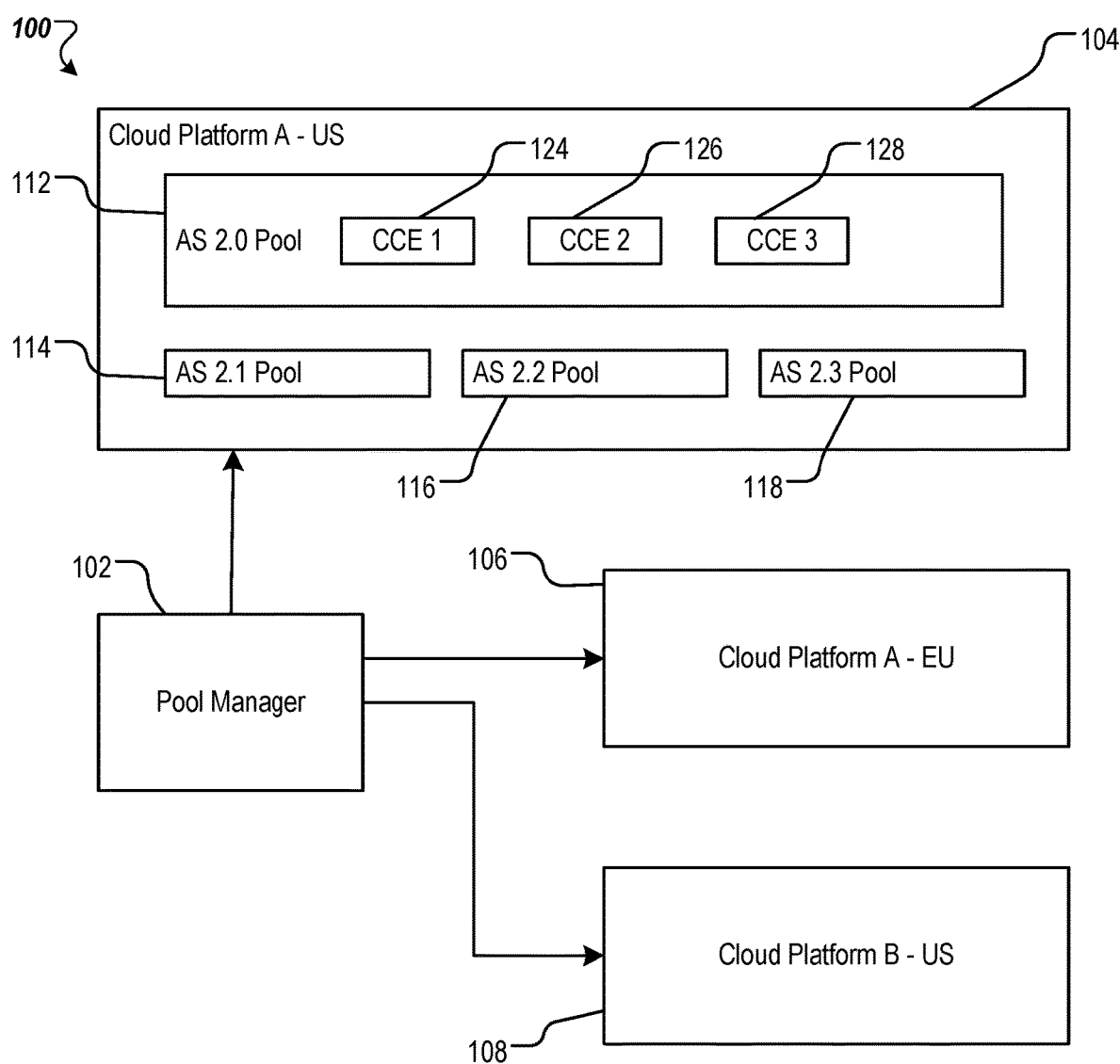
FIG. 1 is a block diagram illustrating example collections of pools of cloud computing environments.

FIG. 1 is a block diagram illustrating example collections of pools of cloud computing environments. A pool manager 102 creates and manages one or more collections of pools of cloud computing environments, including collection 104, collection 106, and collection 108. The pool manager 102 includes one or more computer processors configured to manage pools of cloud computing platforms. A cloud computing environment can include one or more machines and corresponding computing resources configured to execute one or more cloud-based application programs. The machines can include physical computers, virtual machines, or both. The computing resources can include, for example, storage resources, network resources and services. The storage resources can include, for example, memory and disk space. The network resources can include network addresses, security configurations, routing specifications, and virtual routers. The services can include, for example, database services, authentication services, or various application services such as workflow logics.

A user, e.g., a development team, may need a particular cloud computing environment that suits particular needs of the user for developing, testing, and deploying a certain cloud-based application program. Conventionally, the development team specifies a particular version of an application service, also known as an elastic runtime, and a particular version of an operations manager, and spins up a cloud computing environment according to the versions. The pool manager 102, in contrast, creates ready-made pools according to a geographic location, the version of the application service, the version of the operations manager, and a particular version of the cloud platform.

Each collection includes a group of pools having one or more common attributes. For example, the pool manager 102 can create a first collection 104 of pools that corresponds to a first cloud platform and a first region, a second collection 106 of pools that corresponds to a first cloud platform and a second region, and a third collection 108 of pools that corresponds to a second cloud platform and the first region, and so on. Each cloud platform can correspond to a respective cloud computing infrastructure. Example of cloud platforms are Google Cloud Platform (GCP), Amazon Web Service (AWS), among others. Example locations are United States, Europe, among others.

Within each collection, the pool manager 102 can create multiple pools of cloud computing platforms corresponding to particular versions of application services and operations managers. An application service can include a load balancer, virtual routers, and one or more cloud-based applications. Examples of application services include Pivotal Elastic Runtime and Pivotal Application Service. An operations manager can include a set of application program interfaces (APIs) and a graphical user interface to configure and deploy platform components. An example of an operations manager is a Pivotal Cloud Foundry Operations Manager. In the example of FIG. 1, the pool manager creates a first pool 112 for a first version of application service, e.g., application service 2.0, a second pool 114 for a second version of application service, e.g., application service 2.1, a third pool 116 for a third version of application service, and a fourth pool 118 for a fourth version of the application service. For convenience, versions of operations managers are not shown.

Each pool includes one or more cloud computing environments that a user device can use and reuse. For example, the first pool 112 includes a first cloud computing environment 124, a second cloud computing environment 126, and a third cloud computing environment 128. The pool manager 102 can spin up the cloud computing environments 124, 126 and 128 during initialization, or upon receiving first requests from user devices. The cloud computing environments 124, 126 and 128, after being spun up, are ready to be used and reused.

A user device can claim a cloud computing environment from the pool manager 102, rather than spinning up a new cloud computing environment. The pool manager 102 can respond to the claim by providing a reference to a particular cloud computing environment to the user device. For example, the pool manager 102 can provide a reference and credentials for accessing the cloud computing environment 128 to the user device. Users can then deploy application programs in the cloud computing environment 128. Upon completion of tasks in the cloud computing environment 128, the users can unclaim the cloud computing environment 128. After the cloud computing environment 128 is unclaimed, the pool manager 102 can return the cloud computing environment 128 to the pool 112, to be claimed by another user device after being re-deployed or recycled.

Figure 2:
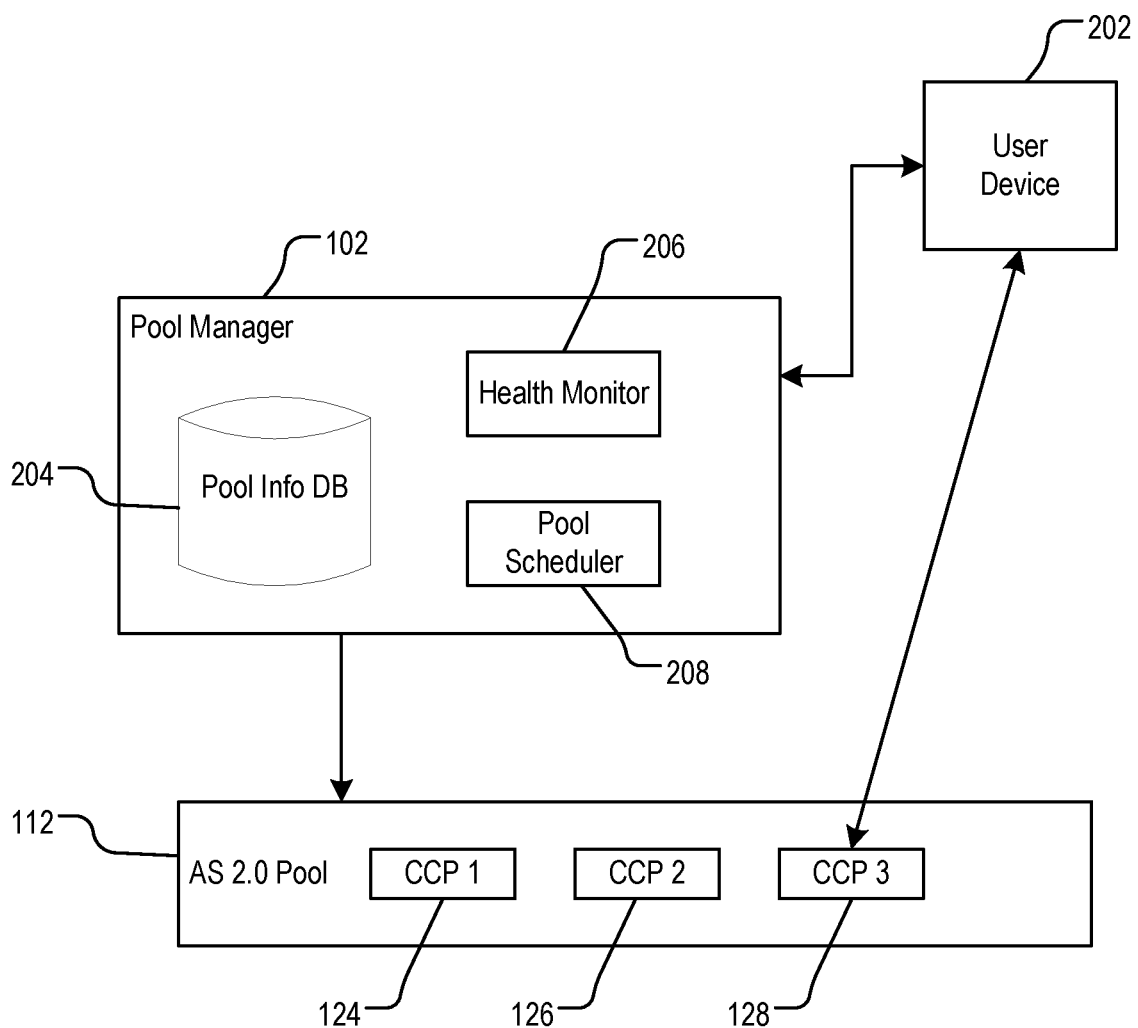
FIG. 2 is a block diagram illustrating example techniques of providing cloud computing environments in response to a claim.

FIG. 2 is a block diagram illustrating example techniques of providing cloud computing environments in response to a claim. A user device 202 can request a cloud computing environment from a pool manager 102. The user device 202 can be a computer operated by a team or an office. In response to an initial request, e.g., an electronic mail, the pool manager 102 can provide a ticket for claiming a cloud computing environment. The ticket can include a token for accessing an application programming interface (API) of the pool manager 102. The token can serve as an authentication instrument.

The user device 202 then submits a claim to the pool manager 102. The claim can be a command line input, a text message, or an electronic mail. The claim includes, or is associated with, the ticket provided by the pool manager 102 and a specification of the cloud computing environment requested. The specification can include a version number of an application service, a version number of an operations manager, a geographic location, and a desired infrastructure.

The pool manager 102 has created a pool 112 of cloud computing environments before or in response to receiving the claim. The pool manager 102 can create the pool 112 according to pre-specified parameters including a headroom value and a maximum environment number. The headroom value is a threshold value specifying a desired minimum unclaimed environments in a pool. An unclaimed environment is a cloud computing environment that is ready to be used, but not yet used by anyone. For example, a headroom value of five can indicate that for a particular pool, it is desirable to have five unclaimed and ready to use environments. A higher headroom value can correspond to higher availability, but lower efficiency.

The maximum environment number is a value that corresponds to the size of a pool. For example, a maximum environment number of eight can indicate that at most eight cloud computing environments are in a pool. A higher maximum environment number can correspond to a larger pool that can be concurrently used by more users, but may correspond to higher maintenance cost. The pool manager 102 can store a respective headroom value and a respective maximum environment number for each pool in a pool information database 204. The pool information database 204 can also store other metadata of the pools, e.g., a time limit indicating how long each cloud computing environment is allowed to be used by a particular user.

The pool manager 102 includes a health monitor 206. The health monitor 206 can include one or more computer processors programmed to monitor health of pools managed by the pool manager 102. Monitoring the health can include, for example, determining how long each cloud computing environment has been claimed by a particular user, and determining whether the time that a cloud computing environment has been claimed by a particular user is approaching or has exceeded the time limit. Upon determining that the time limit has been reached, the health monitor 206 can submit reminders to the user, e.g., by sending an email warning to the user. The time tracked by the health monitor 206 can also be used for billing. In addition, the health monitor 206 can determine integrity of each cloud computing environment in the pool.

The pool manager 102 includes a pool scheduler 208. The pool scheduler 208 can include one or more computer processors programmed to monitor the pools to determine if each pool of cloud computing environments satisfies the corresponding headroom value and the maximum environment number. Additional details of the operations of the pool scheduler 208 are described below in reference to FIG. 3.

In this example, the pool manager 102 manages a pool 112 of cloud computing environments 124, 126 and 128. At time the pool manager 102 receives the claim from the user device 202, the cloud computing environments 124 and 126 have been claimed by other users. The health monitor 206 can designate a status of the cloud computing environments 124 and 126 as claimed. The cloud computing environment 128 has not been claimed by a user. The health monitor 206 can designate a status of the cloud computing environment 128 as unclaimed.

The pool manager 102 identifies the pool 112 in response to the claim. The pool manager 102 can identify an infrastructure type, a geographic region, an application service version and an operations manager version from the specification in the claim. The pool manager 102 then identifies the pool 112, which corresponds to the infrastructure type, geographic region, application service version and operations manager version.

The pool scheduler 208 evaluates the pool 112, and determines that the status of the pool 112 satisfies the headroom value and maximum environment number as stored in the pool information database 204. The pool manager 102 then identifies a next unclaimed cloud computing environment, in this example, the cloud computing environment 128. The health monitor 206 changes the status of the cloud computing environment 128 to be claimed. The pool manager 102 then provides a reference to the cloud computing environment 128 to the user device 202. The reference can include a name of or a link, e.g., an URL, to the cloud computing environment 128. The reference can be associated with one or more configuration parameters of the cloud computing environment 128. A user can then access the cloud computing environment 128 using the reference.

After the user finishes using the cloud computing environment 128, the user can unclaim the cloud computing environment 128 by submitting an unclaim request to the pool manager 102. In response to the unclaim request, the pool manager 102 can change the status of the cloud computing environment 128 from claimed back to unclaimed. The pool manager 102 can then provide a reference to the cloud computing environment 128 to a next user who makes a claim. In some implementations, in response to the unclaim request, the pool manager 102 can perform various cleanup tasks. The cleanup tasks can include, for example, deleting any user data remaining in the cloud computing environment 128, or deleting and recycling the entire infrastructure inside the cloud computing environment 128, or both.

Figure 3:
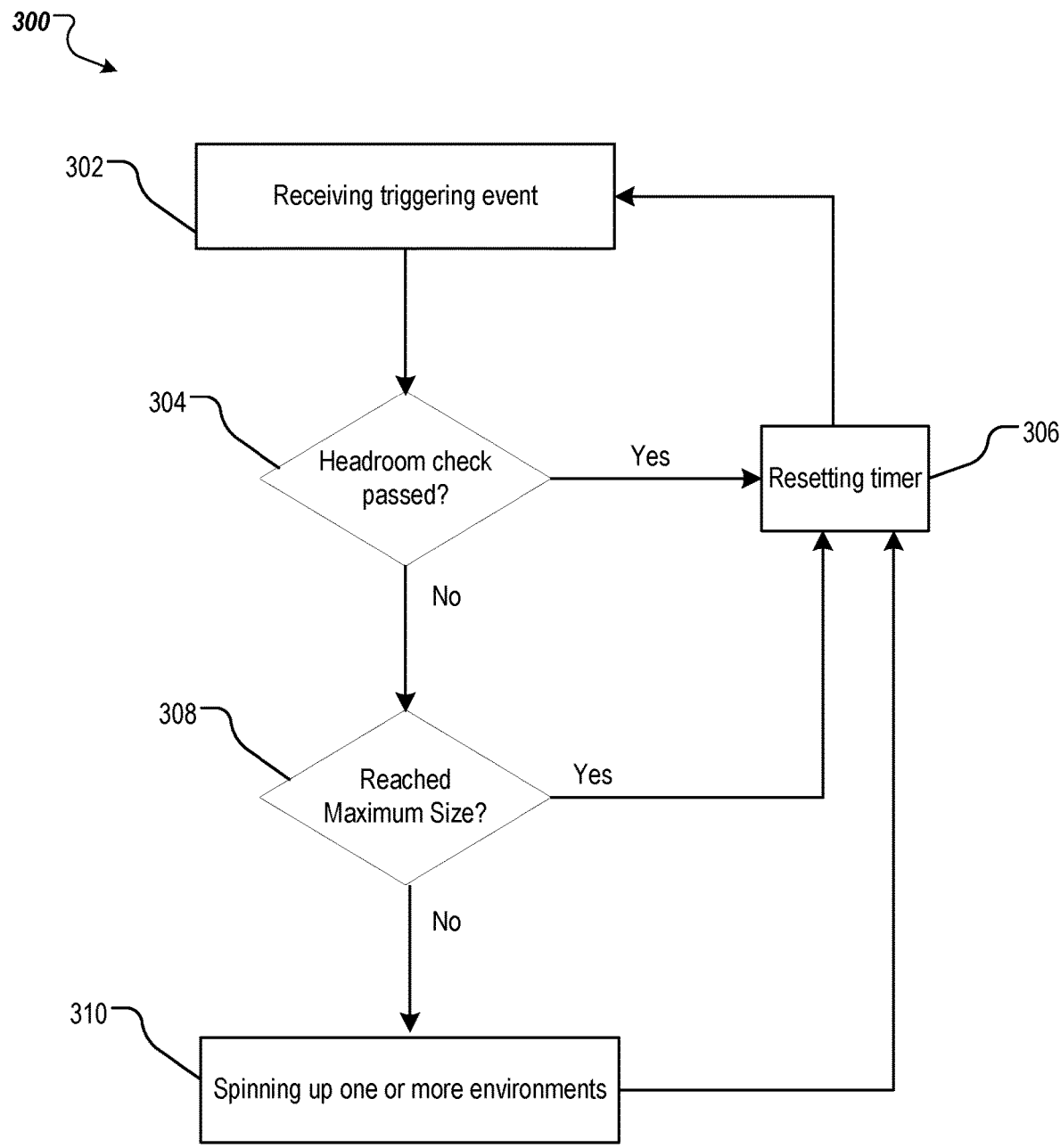
FIG. 3 is a flowchart illustrating an example process of managing a pool of computing environments.

FIG. 3 is a flowchart illustrating an example process 300 of managing a pool of computing environments. The process 300 can be performed by a system including one or more computer processors, e.g., the pool scheduler 208 of FIG. 2.

In particular, the system can execute process 300 to evaluate a pool and to ensure that a pool of cloud computing environments is optimized in terms of efficiency and availability, given a headroom value and a maximum environment number.

The system receives (302) a triggering event. The triggering event can include a claim submitted by a user, or a scheduled timer event. In some implementations, a pool scheduler determines a time period for performing an evaluation. The time period can be, for example, five minutes, ten minutes, or fifteen minutes. The system then performs an evaluation every five minutes, ten minutes, or fifteen minutes.

In response to the triggering event, the system performs (304) a headroom check. Performing the headroom check can include determining whether a pool has enough available cloud computing environments left that satisfy the headroom value. For example, performing the headroom check can include determining a sum of unclaimed cloud computing environments and initializing cloud computing environments. An initializing cloud computing environment is a cloud computing environment in the process of being spun up but has not been completely configured. The system can designate the sum as available cloud computing environments. The system designates the headroom check as passed if the sum is less than the headroom value.

If the headroom check has passed, the system can reset (306) the timer for next periodical check, and then repeat the process 300. In this case, the system does not spin up a new cloud computing environment. A user device will receive an existing ready-to-use cloud computing environment from within the pool.

If the headroom check did not pass, the system performs (308) a maximum size check. In the maximum size check, the system determines if the pool has reached maximum size, as defined by the maximum environment number. In the maximum size check, the system determines a sum of number of cloud computing environments in various status, including number of environments in initializing status, number of environments in claimed status, number of environments in unclaimed status, number of environments in deleting status and number of environments in error status. The deleting status indicates that a particular cloud computing environment is being deleted. The error status indicates that a particular cloud computing environment is in error and needs administrator attention.

The system can determine that the pool has reached maximum size in response to determining that the sum is greater than or equals to the maximum environment number. If the system determines that the pool has reached maximum size, the system can reset (306) the timer. The system does not spin up a new cloud computing environment. If a user is attempting to claim a new environment, the user can wait until an environment is unclaimed.

The system can determine that the pool has not reached maximum size in response to determining that the sum is less than the maximum environment number. If the system determines that the pool has not reached maximum size, the system can spin up (310) one or more new cloud computing environments for the pool. If a user is attempting to claim a new environment, the user can wait until a new environment is spun up.

Figure 4:
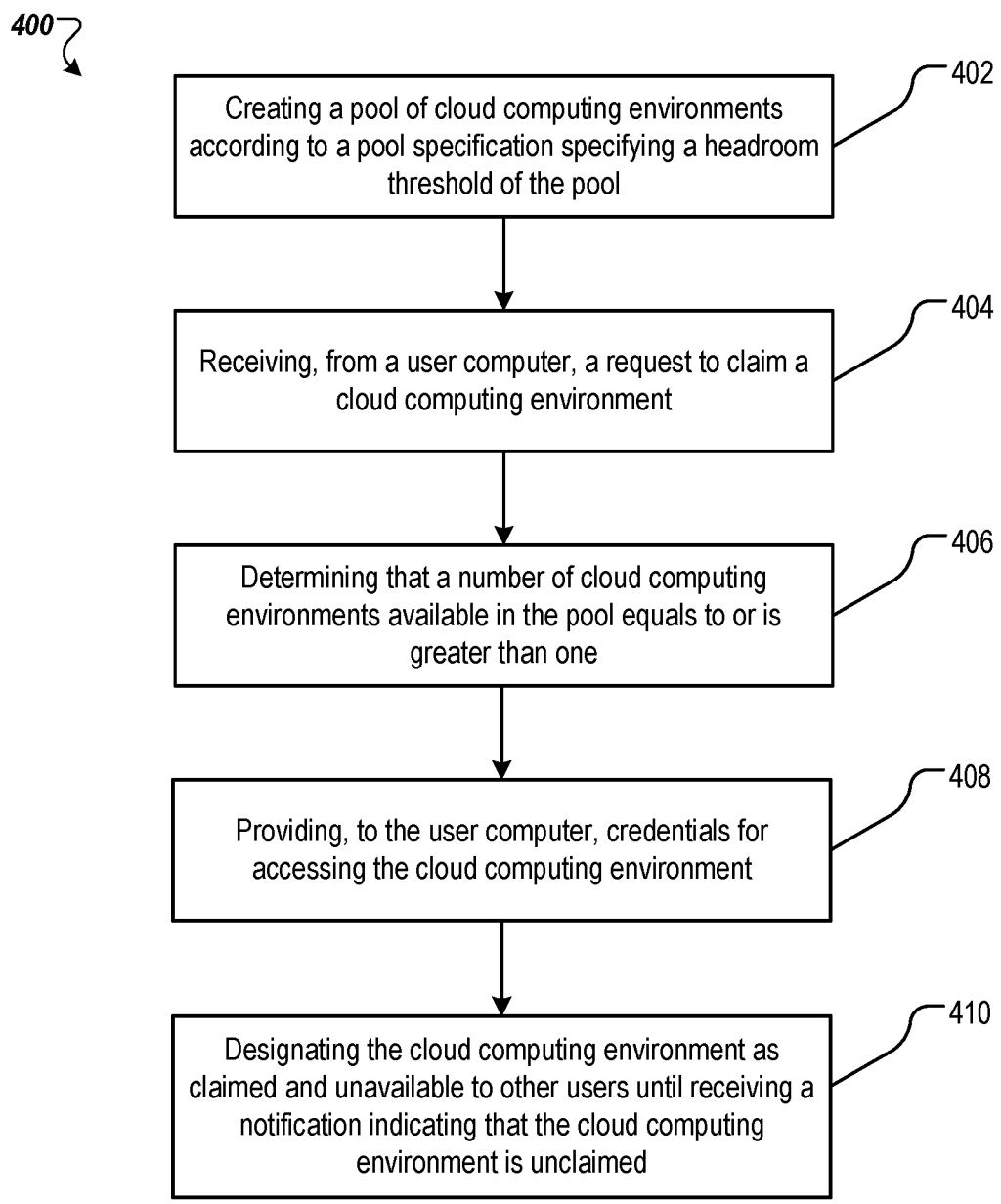
FIG. 4 is a flowchart illustrating an example process of provisioning cloud computing environments.

FIG. 4 is a flowchart illustrating an example process 400 of provisioning cloud computing environments. The process 400 can be performed by a system including one or more processors, e.g., the pool manager 102 of FIG. 1 and FIG. 2.

The system creates (402) a pool of cloud computing environments according to a pool specification specifying a headroom threshold of the pool. The headroom threshold can be stored in a pool information database as a headroom value that includes a desired minimum number of unclaimed and available cloud computing environments in the pool, as described above. Available cloud computing environments can also include cloud computing environments being initialized. In some implementations, the pool specification can also specify a maximum number of cloud computing environments in the pool, as a maximum environment number as described above.

Creating the pool can include designating a geographic region from where the pool manager accepts requests to claim cloud computing environments and a version number of cloud computing environments in the pool. The version number of cloud computing environments in the pool can correspond to a version number of an application service of a cloud computing environment, a version number of an operations manager of the cloud computing environment, and a version number of a cloud computing infrastructure on which the cloud computing environment is deployed.

The system receives (404), from a user device, a request to claim a cloud computing environment for a user. The request can be associated with user identifier and credentials. The credentials can be provided to the user by the system after the user registers with the system to use the pool.

The system determines (406) whether a number of cloud computing environments available in the pool equals to or is greater than one, allowing the system to provide a pre-configured cloud computing environment from the pool to the user.

The system provides (408), to the user computer, credentials for accessing the cloud computing environment. Providing the credentials for accessing the cloud computing environment can include providing an authentication token, a name of the cloud computing environment, and a link to the cloud computing environment.

After an environment is claimed, the process 400 receives a triggering event. In response to determining that the headroom threshold is not satisfied, e.g., when the system determines that a sum of number of unclaimed cloud computing environments and a number of cloud computing environments being initialized is not greater than the desired minimum number of unclaimed environments in the pool, the system can determine whether a sum of the number of unclaimed cloud computing environments, the number of cloud computing environments being initialized, the number of cloud computing environments being deleted, and the number of cloud computing environments in error is smaller than the maximum number of cloud computing environments in the pool. If yes, the system can spin up one or more new cloud computing environments, and add the one or more new cloud computing environments to the pool.

The system designates (410) the cloud computing environment as claimed and unavailable to other users until receiving a notification indicating that the cloud computing environment is unclaimed. The user can deploy and test one or more application programs in the claimed cloud computing environment.

In some implementations, the system can detect that a time period that the user has claimed the cloud computing environment has exceeded a squatting threshold, e.g., two weeks. In response, the system submits a warning to the user prompting the user to unclaim the claimed cloud computing environment. The warning can be an email message or a text message.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

The invention claimed is:

1. A method comprising:
   executing, by a computing system comprising one or more processors, a pool manager, the pool manager being software that manages a collection of pools of cloud computing environments;
   creating, the pool manager and according to a specification, a first pool of cloud computing environments, the specification indicating a maximum number of cloud computing environments in the first pool and a headroom threshold of the first pool, the headroom threshold comprising a desired minimum number of unclaimed and available cloud computing environments in the first pool;
   receiving, by the pool manager and from a user computer, a request to claim a cloud computing environment for a user;
   providing, by the pool manager to the user computer, information for accessing the first pool of cloud computing environments if the first pool maximum number of cloud computing environments and the headroom threshold is satisfied;
   designating, by the pool manager, the first pool of cloud computing environments as claimed and unavailable to other users; and
   deploying, by the pool manager, the first pool of cloud computing environments.

2. The method of claim 1, wherein:
   the first pool of cloud computing environments comprises a plurality of cloud computing environments, each cloud computing environment comprising computing resources provided by one or more virtual machines (VM); and creating each clouding computing environment comprises at least one of:
- creating a respective one or more VMs for that cloud computing environment; or
- configuring a respective one or more VMs for that cloud computing environment.

3. The method of claim 1, wherein the information for accessing the cloud computing environment is provided in response to a determination that providing the cloud computing environment for the user will not exceed the maximum number of cloud computing environments.

4. The method of claim 1, further comprising:
in response to a determination that a number of cloud computing environments available in the first pool is fewer than the headroom threshold, creating a second pool of cloud computing environments.

5. The method of claim 1, wherein creating the first pool comprises designating a geographic region from which the pool manager will accepts requests to claim cloud computing environments.

6. The method of claim 1, wherein the information for accessing the cloud computing environment comprises user credentials, a name of the cloud computing environment, and a link to the cloud computing environment.

7. The method of claim 1, further comprising:
deploying and testing, by the pool manager and prior to receiving the request from the user computer, one or more application programs in the cloud computing environment.

8. A non-transitory computer readable medium stored thereon instructions executable by one or more processors to cause a computing system to perform operations comprising:
executing a pool manager, the pool manager being software that manages a collection of pools of cloud computing environments;
creating, by the pool manager and according to a specification, a first pool of cloud computing environments, the specification indicating a maximum number of cloud computing environments in the first pool and a headroom threshold of the first pool, the headroom threshold comprising a desired minimum number of unclaimed and available cloud computing environments in the first pool;
receiving, by the pool manager and from a user computer, a request to claim a cloud computing environment for a user;
providing, by the pool manager to the user computer, information for accessing the first pool of cloud computing environments if the first pool maximum number of cloud computing environments and the headroom threshold is satisfied;
designating, by the pool manager, the first pool of cloud computing environments as claimed and unavailable to other users; and
deploying, by the pool manager, the first pool of cloud computing environments.

9. The non-transitory computer readable of claim 8, wherein:
the first pool of cloud computing environments comprises a plurality of cloud computing environments, each cloud computing environment comprising computing resources provided by one or more virtual machines (VM); and
creating each clouding computing environment comprises at least one of:
- creating a respective one or more VMs for that cloud computing environment; or
- configuring a respective one or more VMs for that cloud computing environment.

10. The non-transitory computer readable of claim 8, wherein the information for accessing the cloud computing environment is provided in response to a determination that providing the cloud computing environment for the user will not exceed the maximum number of cloud computing environments.

11. The non-transitory computer readable of claim 8, the operations further comprising:
in response to a determination that a number of cloud computing environments available in the first pool is fewer than the headroom threshold, creating a second pool of cloud computing environments.

12. The non-transitory computer readable of claim 8, wherein creating the first pool comprises designating a geographic region from which the pool manager will accepts requests to claim cloud computing environments.

13. The non-transitory computer readable of claim 8, wherein the information for accessing the cloud computing environment comprises user credentials, a name of the cloud computing environment, and a link to the cloud computing environment.

14. The non-transitory computer readable of claim 8, the operations further comprising:
deploying and testing, by the pool manager and prior to receiving the request from the user computer, one or more application programs in the cloud computing environment.

15. A computing system, comprising:
one or more processors; and
non-transitory computer readable medium stored thereon instructions executable by one or more processors to perform operations comprising:
executing a pool manager that manages a collection of pools of cloud computing environments;
creating, by the pool manager and according to a specification, a first pool of cloud computing environments, the specification indicating a maximum number of cloud computing environments in the first pool and a headroom threshold of the first pool, the headroom threshold comprising a desired minimum number of unclaimed and available cloud computing environments in the first pool;
receiving, by the pool manager and from a user computer, a request to claim a cloud computing environment for a user;
providing, by the pool manager to the user computer, information for accessing the first pool of cloud computing environments if the first pool maximum number of cloud computing environments and the headroom threshold is satisfied;
designating, by the pool manager, the first pool of cloud computing environments as claimed and unavailable to other users; and
deploying, by the pool manager, the first pool of cloud computing environments.

16. The computing system of claim 15, wherein:
the first pool of cloud computing environments comprises a plurality of cloud computing environments, each cloud computing environment comprising computing resources provided by one or more virtual machines (VM); and creating each clouding computing environment comprises at least one of:
    creating a respective one or more VMs for that cloud computing environment; or
    configuring a respective one or more VMs for that cloud computing environment.

17. The computing system of claim 15, wherein the information for accessing the cloud computing environment is provided in response to a determination that providing the cloud computing environment for the user will not exceed the maximum number of cloud computing environments.

18. The computing system of claim 15, the operations further comprising:
    in response to a determination that a number of cloud computing environments available in the first pool is fewer than the headroom threshold, creating a second pool of cloud computing environments.

19. The computing system of claim 15, wherein creating the first pool comprises designating a geographic region from which the pool manager will accepts requests to claim cloud computing environments.

20. The computing system of claim 15, wherein the information for accessing the cloud computing environment comprises user credentials, a name of the cloud computing environment, and a link to the cloud computing environment.

* * * * *